United States Patent
Li et al.

(10) Patent No.: US 12,354,799 B2
(45) Date of Patent: Jul. 8, 2025

(54) INTEGRATED POLYPHASE HYDROGEL AND PREPARATION METHOD AND APPLICATION THEREOF IN FLEXIBLE AND STRETCHABLE SUPERCAPACITOR

(71) Applicant: Jilin University, Changchun (CN)

(72) Inventors: Wen Li, Changchun (CN); Chuanling Mu, Changchun (CN)

(73) Assignee: Jilin University, Changchun (CN)

(*) Notice: Subject to any disclaimer, the term of this patent is extended or adjusted under 35 U.S.C. 154(b) by 0 days.

(21) Appl. No.: 18/911,535

(22) Filed: Oct. 10, 2024

(65) Prior Publication Data
US 2025/0034337 A1    Jan. 30, 2025

(30) Foreign Application Priority Data
Oct. 10, 2023 (CN) .......................... 202311123011.4

(51) Int. Cl.
| H01G 11/84 | (2013.01) |
| H01G 11/86 | (2013.01) |
| C08J 3/075 | (2006.01) |
| C08K 3/30 | (2006.01) |
| C08K 5/521 | (2006.01) |
| C08L 29/04 | (2006.01) |

(52) U.S. Cl.
CPC ............ *H01G 11/84* (2013.01); *H01G 11/86* (2013.01); *C08J 3/075* (2013.01); *C08K 3/30* (2013.01); *C08K 5/521* (2013.01); *C08L 29/04* (2013.01)

(58) Field of Classification Search
None
See application file for complete search history.

(56) References Cited

U.S. PATENT DOCUMENTS

| 2011/0178184 A1 | 7/2011 | Kaneko et al. |
| 2017/0190844 A1 | 7/2017 | Zeng et al. |
| 2022/0340719 A1 | 10/2022 | Iizuka et al. |

FOREIGN PATENT DOCUMENTS

| CN | 110690056 A | * | 1/2020 | ......... C08G 73/0266 |
| CN | 110690056 B | * | 10/2021 | ......... C08G 73/0266 |

OTHER PUBLICATIONS

Badawi et al., "Recent advances in flexible/stretchable hydrogel electrolytes in energy storage devices", Journal of Energy Storage, 73 (2023) 108810, 30 pages. (Year: 2023).*
Wang et al., "High performance flexible carbon cloth-based solid-state supercapacitors with redox-mediated gel electrolytes", Applied Surface Science, 583 (2022) 152397, 8 pages. (Year: 2022).*
Gao et al., "A novel all-in-one integrated flexible supercapacitor based on self-healing hydrogel electrolyte", Journal of Alloys and Compounds, 888 (2021) 161554, 9 pages. (Year: 2021).*
Nandi et al., "Hybrid polymer gels for energy applications", Journal of Materials Chemistry A, (2023), 11, 12593, 50 pages. (Year: 2023).*
Palanichamy et al., "PVA and PMMA nano-composites: a review on strategies, applications and future prospects", Materials Research Express, 10 (2023) 022002, 23 pages. (Year: 2023).*
Pyarasani et al., "Polyaniline-based conducting hydrogels", Journal of Materials Science, (2018), 54:974-996. 23 pages. (Year: 2018).*
Lai et al., "Self-healing flexible and strong hydrogel nanocomposites based on polyaniline for supercapacitors", Ionics (2020), 26: 3015-3025, 11 pages. (Year: 2020).*
Wan et al., "A flexible, robust cellulose/phytic acid/polyaniline hydrogel for all-in-one supercapacitors and strain censors", Journal of Materials Chemistry A, (2022), 10, 17279, 9 pages. (Year: 2022).*
CNIPA, Notification of First Office Action for Chinese application CN202311123011.4, Jul. 16, 2024.
CNIPA, Notification to grant patent right for Chinese application CN202311123011.4, Sep. 29, 2024.

* cited by examiner

*Primary Examiner* — Scott B Geyer
(74) *Attorney, Agent, or Firm* — Hemisphere Law, PLLC; Zhigang Ma

(57) ABSTRACT

The present invention discloses an integrated multiphase hydrogel, and a preparation method and application thereof in flexible and stretchable supercapacitors. The integrated multiphase hydrogel of the present invention is formed by implanting semigel electrode into semigel electrolyte by injection or printing, wherein the electrolyte hydrogel is prepared by polyvinyl alcohol, phytic acid and sulfuric acid. The electrode hydrogel is prepared from heteropoly acid, polyvinyl alcohol, phytic acid, ammonium persulfate and aniline by heating and then freeze thawing. The hydrogel of the present invention can be directly used as anode and cathode of stretchable electrode of flexible and stretchable supercapacitor without any post-processing. The electrolyte hydrogel can be used as both stretchable electrolyte and elastic substrate. The prepared flexible and stretchable supercapacitor can maintain superior interfacial toughness, have excellent charging/discharging cycle stability, and have good capacitance retention under mechanical deformation conditions such as bending, twisting and stretching.

4 Claims, 7 Drawing Sheets

INTEGRATED POLYPHASE HYDROGEL AND PREPARATION METHOD AND APPLICATION THEREOF IN FLEXIBLE AND STRETCHABLE SUPERCAPACITOR

TECHNICAL FIELD

The present invention relates to the technical field of hydrogel materials, in particular to an integrated polyphase hydrogel, and a preparation method and application thereof in a flexible and stretchable supercapacitor.

BACKGROUND

The stretchable supercapacitor (SC) has attracted great interest due to its reliable safety, high power density, fast charge and discharge rate and long cycle life (H. Huang, C. M. Lin, Z. F. Hua, J. J. Guo, D. D. Lu, Y. H. Ni, S. L. Cao, X. J. Ma, Chem. Eng. J. 2022, 448, 137589). The stretchable supercapacitor is generally a three-layer structural design having an electrolyte layer sandwiched between two electrode layers. A sandwich stretchable supercapacitor can maintain high energy and power density under large strain. However, a series integrated supercapacitor mainly relies on a large number of conductive metal wires, which is an important obstacle to building a stretchable device with high voltage output. (Q. Gong, Y. Q. Li, X. H. Liu, Z. B. Xia, Y. Yang, Carbohydr. Polym. 2020, 245, 116611; Z. K. Wang and Q. M. Pan, Adv. Funct. Mater. 2017, 27, 1700690). Therefore, a great challenge in the field of the stretchable supercapacitor is how to optimize the interface connection between electrodes and electrolytes by designing innovative materials or the structure of the supercapacitor.

Generally, to overcome this challenge, a two-dimensional (2D) SC structure has recently been developed by a method of printing a current collector and electrochemically active material on a stretchable polymer substrate. This planar structure design has no external metal interconnection, which greatly simplifies the series integration process of SC devices. However, due to poor interfacial bonding between the electrodes and the polymer substrate, the obtained SC exhibits unsatisfactory capacitance retention during stretching deformation (P. Das, L. Z. Zhang, S. H. Zheng, X. Y. Shi, Y. J. Li, Z.-S. Wu, Carbon, 2022, 196, 203-212), even though several wrinkling geometry and interface engineering strategies have been used. More frustratingly, because the interface engineering method is only suitable for eliminating the stretching strain of high-modulus electrodes near the interface and not suitable for the bulk phase of thicker electrode coatings, the thickness of the electrode coatings is very limited (L. Z. Zhang, D. Liu, Z.-S. Wu, W. W. Lei, Energy Environ. Sci. 2020, 32, 402-417). The general limitation of electrode thickness is a major bottleneck in the construction of SCs with high energy density and high power density.

Therefore, from the perspective of application, an urgent technical problem for those skilled in the art is to provide a flexible and stretchable supercapacitor with large strain tolerance, high energy and power density, easy integration and simple material design.

SUMMARY

In view of this, the present invention provides a solution for constructing a flexible and stretchable supercapacitor with good interfacial toughness, large strain, high energy and power density, and easy integration by using an integrated polyphase hydrogel.

To achieve the above purpose, the present invention adopts the following technical solution:

A preparation method of an integrated polyphase hydrogel comprises the following steps:

(1) dissolving polyvinyl alcohol and phytic acid in water, then adding sulfuric acid, stirring at 75-95° C. for 2-3 h to obtain a homogeneous solution, and then cooling to room temperature to form PVA/SA/PA semigel electrolyte;

(2) dissolving the polyvinyl alcohol in the phytic acid, stirring at 75-95° C. for 2-3 h, then adding ammonium persulfate and heteropoly acid to obtain a homogeneous solution, adding phytic acid and aniline to the solution, stirring continuously at 75-95° C. for 3-4 h, and freezing at −30 to −20° C. for 4-6 h to obtain a PVA/PA/PANI/HPA semigel electrode;

(3) injecting the PVA/SA/PA semigel electrolyte into a mold, and then injecting the PVA/PA/PANI/HPA semigel electrode into the PVA/SA/PA semigel electrolyte to form parallel electrodes with controllable spacing; covering the mold with the PVA/SA/PA semigel electrolyte to ensure that the PVA/PA/PANI/HPA is fully embedded into the bulk phase of the PVA/SA/PA semigel electrolyte, finally freezing the mold and then thawing at room temperature to obtain an integrated polyphase hydrogel.

The integrated polyphase hydrogel of the present invention is a polyphase hydrogel formed by injecting two parallel wavy (or other shapes, such as rectangular, V-shaped, etc.) PVA/PA/PANI/HPA semigel electrodes into the bulk phase of the PVA/SA/PA semigel electrolyte. The wavy hydrogel arranged in parallel can be directly used as an anode and a cathode of a stretchable electrode of a flexible and stretchable supercapacitor without any post-processing. The PVA/SA/PA hydrogel can be used as both a stretchable electrolyte and an elastic substrate. The prepared flexible and stretchable supercapacitor can maintain superior interfacial toughness, has excellent charge and discharge cycle stability, and has good capacitance retention rate under mechanical deformation conditions such as bending, twisting and stretching.

Further, the PVA/SA/PA semigel electrolyte in step (1) is composed of the following mass fractions of raw materials: 13.76-26.20% of polyvinyl alcohol, 58.07-80.64% of phytic acid, and the balance of sulfuric acid.

The further solution has the following beneficial effects: the PVA/SA/PA semigel prepared by the above solution of the present invention can be used as a stretchable electrolyte and an elastic substrate, wherein PA can significantly enhance the hydrogen bond effect between PVA and PA, thereby improving the mechanical properties of the PVA/S/PA hydrogel. Sulfuric acid(S) increases the proton conductivity of the PVA/S/PA hydrogel.

Further, the PVA/PA/PANI/HPA semigel electrode in step (2) is composed of the following mass fractions of raw materials: the mass fraction of polyvinyl alcohol is 7.97-10.4%, the mass fraction of phytic acid is 53.14-69.84%, the mass fraction of heteropoly acid is 9.52-29.63%, the mass fraction of aniline is 1.72%-2.44%, and the rest is ammonium persulfate.

The further solution has the following beneficial effects: the PVA/PA/PANI/HPA semigel prepared by the above solution of the present invention can be directly used as a cathode and an anode of a stretchable electrode of a flexible and stretchable supercapacitor, wherein as an inorganic nanocluster, polyvalent HPA not only acts as a multifunctional supramolecular crosslinker to connect PANI together to form a solid network at the macro level, but also has redox activity to accept and give electrons. The PANI acts as a current collector to accelerate electron transfer.

Further, the heteropoly acid in step (2) is any one or a combination of more of $H_6P_2W_{18}O_{62}$ ($P_2W_{18}$), $H_4SiW_{12}O_{40}$ (SiW), $H_3PW_{12}O_{40}$ (PW) and $H_3PMo_{12}O_{40}$ (PMO).

The further solution has the following beneficial effects: the PVA/PA/PANI/HPA electrode prepared by the above heteropoly acid has wide applicability by replacing different types of HPAs.

Further, the mold in step (3) is a wavy mold with a length of 4.0-5.0 cm, a width of 1.0-2.0 cm and a depth of 3.0-3.5 mm.

Further, the freezing temperature in step (3) is −30 to −20° C., freezing time is 22-24 h and thawing time is 2-3 h.

The further solution has the following beneficial effects: the shape and the specification of the mold can be effectively fixed by the above solution of the present invention, so as to realize a wavy electrode with a certain specification; and the hydrogel is better cross-linked by freezing and thawing.

The present invention further provides an application of the above integrated polyphase hydrogels in preparation of a flexible and stretchable supercapacitor. In the flexible and stretchable supercapacitor: the integrated polyphase hydrogel is used to ensure that two parallel gel electrodes are completely placed in the gel electrolyte in a preparation process to form an integrated polyphase gel comprising both the electrodes and the electrolyte, and then a carbon cloth is connected at one end of each electrode respectively to obtain a flexible and stretchable integrated polyphase gel supercapacitor.

Further, the thickness of the gel electrodes is 3.0-3.5 mm, the length is 3.9-4.2 cm, the width is 1.0-2.0 cm, and a distance between the gel electrodes is 2.2-3.0 mm.

The further solution has the following beneficial effects: the present invention can obtain best, stable and repeatable experimental data by setting the shape and the specification of the electrodes and the distance between the gel electrodes.

Further, the two parallel gel electrodes are formed by connecting a pair of parallel electrodes or multiple pairs of parallel electrodes in series.

Further, the shape of the electrodes is wavy, linear, V-shaped, rectangular or other shapes.

The further solution has the following beneficial effects: the voltage is increased for the multiple pairs of parallel electrodes connected in series to achieve the effect of lighting the devices, which shows the application prospect of the flexible integrated polyphase gel. The replacement of different shapes of the electrodes indicates that the polyphase gel has the characteristics of customizability, patterning and microminiaturization.

The present invention has the following beneficial effects:
1) The hydrogel electrolyte PVA/SA/PA with low elastic modulus around the PVA/PA/PANI/HPA hydrogel electrode can effectively disperse tensile stress, protect the hydrogel electrode with high elastic modulus, and delay the cracking of the PVA/PA/PANI/HPA hydrogel electrode.
2) A package structure greatly expands the connection area between PVA/SA/PA and PVA/PA/PANI/HPA, which is conducive to improving the interfacial bonding strength and inhibiting delamination and displacement;
3) When the polyphase hydrogel is stretched along a latitudinal direction parallel to the surface, the thickness of the hydrogel is greatly reduced due to longitudinal contraction. In this case, the peripheral hydrogel electrolyte may experience greater contraction than the electrode, so as to promote tight connection between the electrolyte and the electrodes.

Therefore, compared with the traditional sandwich structure, the present invention has the advantage of solving the problems such as interfacial displacement and separation which are inevitable during repeated mechanical stretching due to the mismatch of inherent Young's modulus and bulk strain between the electrode and the electrolyte layer of the traditional sandwich supercapacitor. Compared with the newly developed two-dimensional planar capacitors, the present invention has the advantage of solving the problem that the two-dimensional planar supercapacitor exhibits unsatisfactory tolerance during tensile deformation due to poor interfacial adhesion between the electrode and the polymer substrate. The present invention simultaneously integrates the advantages of the above two designs. The flexible and stretchable supercapacitor prepared by using the PVA/PA/PANI/HPA@PVA/SA/PA integrated polyphase gel has a capacitance retention rate of more than 93% in deformation processes such as stretching.

DETAILED DESCRIPTION

Technical solutions in the embodiments of the present invention are described clearly and fully below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Preparation of PVA/PA/PANI/(PW-14%)-(PMO-10%)@PVA/SA/PA integrated polyphase gel:

(1) Polyvinyl alcohol (PVA, 3.0 g) and phytic acid (PA, 19.9 g) were dissolved in deionized water (5.4 mL); then 1 mL of sulfuric acid (SA) was added, and stirred at 85° C. for 2 h to obtain a homogeneous solution; and the homogeneous solution was cooled to room temperature to form a PVA/SA/PA semigel electrolyte.

The PVA/SA/PA semigel was taken, frozen at −30° C. for 24 h and then thawed at room temperature for 2 h to obtain a stretchable hydrogel electrolyte.

(2) PVA (2.0 g) was dissolved in PA (13.3 g) and stirred at 95° C. for 2 h to form a uniform solution. Then, 0.67 g of PA and 0.47 g of aniline were mixed into 2 mL of deionized water. 1 mL of aqueous solution containing ammonium persulfate (APS, 0.29 g), $H_3PW_{12}O_{40}$ (PW, 3.5 g) and $H_3PMo_{12}O_{40}$ (PMO, 2.5 g) was quickly added into PVA/PA solution and continuously stirred at 85° C. for 4 h. Then, the mixed solution gradually changed from white to dark green, which showed that ammonium persulfate (APS) oxidized aniline monomer to produce PANI. The dark green solution was frozen at −20° C. for 4 h to obtain the PVA/PA/PANI/(PW-14%)-(PMO-10%) semigel.

Finally, the PVA/PA/PANI/(PW-14%)-(PMO-10%) semigel was frozen at −20° C. for 24 h, and then thawed at room temperature for 2 h to obtain a stretchable hydrogel electrode.

(3) The PVA/SA/PA semigel electrolyte was injected into a mold (a wavy mold with a length of 4.0 cm, a width of 2.0 cm, and a depth of 3.0 mm). Then, the PVA/PA/PANI/(PW-14%)-(PMO-10%) semigel electrode was injected into the PVA/SA/PA semigel electrolyte to form parallel electrodes with controllable spacing (the coating has a thickness of 3.0 mm, a length of 3.9 cm, and a width of 1.0 cm, and the spacing between two waves is 2.2 mm). Subsequently, the mold was covered with the PVA/SA/PA semigel electrolyte to ensure that PVA/PA/PANI/(PW-14%)-(PMO-10%) was fully embedded in the bulk phase of the PVA/SA/PA semigel electrolyte. Finally, the mold was frozen at −20° C. for 24 h and then thawed at room temperature for 2 h to form PVA/PA/PANI/(PW-14%)-(PMO-10%)@PVA/SA/PA integrated polyphase hydrogel.

Figure 1:
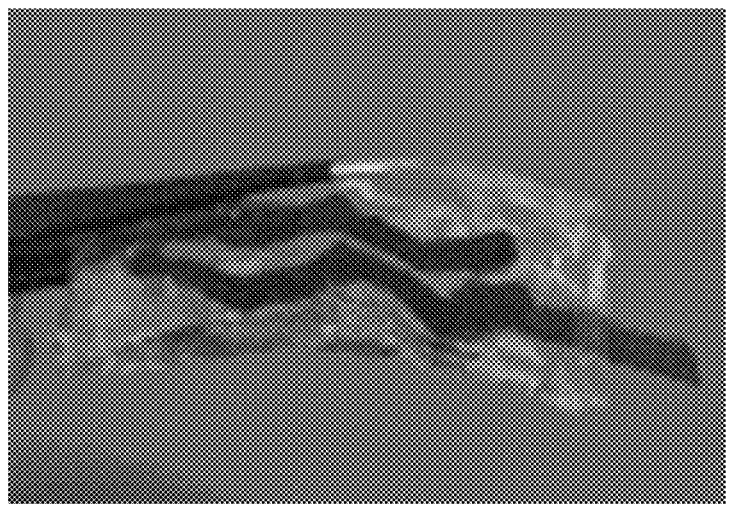
FIG. 1 is an optical photo of PVA/PA/PANI/(PW-14%)-(PMO-10%)@PVA/SA/PA integrated polyphase gel in embodiment 1 of the present invention.

FIG. 1 is a digital photo of PVA/PA/PANI/(PW-14%)-(PMO-10%)@PVA/SA/PA integrated polyphase hydrogel. It can be seen from the figure that the PVA/SA/PA electrolyte wraps the PVA/PA/PANI/(PW-14%)-(PMO-10%) electrode, which illustrates the structure of the integrated polyphase gel.

Test case 1 Interfacial properties of PVA/PA/PANI/(PW-14%)-(PMO-10%)@PVA/SA/PA integrated polyphase gel The freeze-dried PVA/PA/PANI/(PW-14%)-(PMO-10%)@PVA/SA/PA integrated polyphase gel (length of 30 mm, width of 8 mm and thickness of 3 mm) in embodiment 1 was bonded on a section table (diameter of 30 mm) used for measuring scanning electron microscope. The fusion of an interface region between electrodes and electrolytes in the polyphase gel was detected by a scanning electron microscope. The PVA/PA/PANI/(PW-14%)-(PMO-10%)@PVA/SA/PA integrated polyphase gel (length of 30 mm, width of 8 mm and thickness of 3 mm) and the sandwich supercapacitor (length of 30 mm, width of 8 mm and thickness of 3 mm) were placed under a microscope. The changes of the interface region between electrodes and electrolytes were observed under different stretching ratios (0%-800%).

Figure 2:
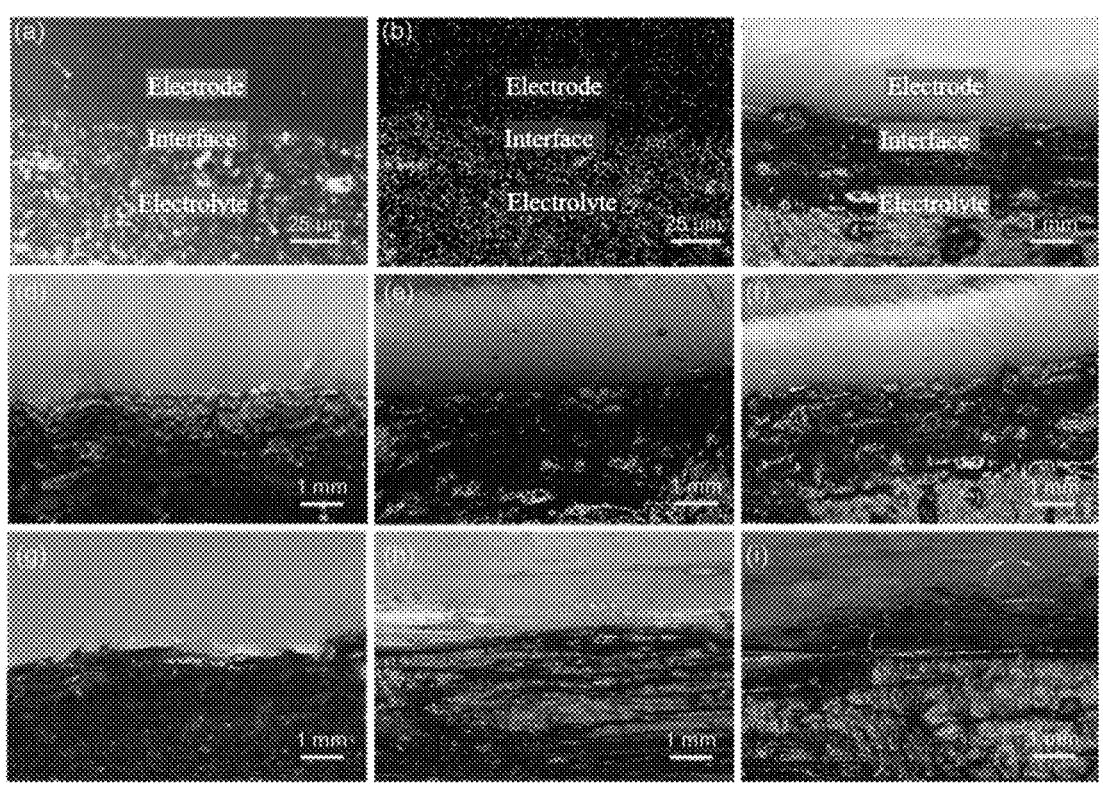
FIG. 2 shows an interfacial scanning electron micrograph photo of PVA/PA/PANI/(PW-14%)-(PMO-10%)@PVA/SA/PA integrated polyphase gel in embodiment 1 of the present invention (a), corresponding EDS image photo (b) and optical microscope digital photo (c); digital microscope photos of interface changes of electrodes and electrolytes of PVA/PA/PANI/(PW-14%)-(PMO-10%)@PVA/SA/PA integrated multiphase gel (d-f) and PVA/PA/PANI/(PW-14%)-(PMO-10%)//PVA/SA/PA sandwich supercapacitor (g-i) under different stretching (0%-800%).

FIG. 2 shows the SEM photos of the fusion of the interface region between electrodes and electrolytes (e.g., whether there is seamless connection in the interface region) in the PVA/PA/PANI/(PW-14%)-(PMO-10%)@PVA/SA/PA polyphase gel; and digital microscope photos of changes in the interface region between electrodes and electrolytes (e.g., whether the interface region is delaminated, ruptured, etc.) at 0%-800% stretching ratio of polyphase gel and sandwich gel.

It can be seen from a cross-section scanning electron microscope image (FIG. 2a) of the polyphase hydrogel that there is seamless interfacial connection in the interface region.

The corresponding W image (FIG. 2b) clearly reveals the interfacial diffusion of the PVA/PA/PANI/(PW-14%)-(PMO-10%) electrode and the PVA/SA/PA electrolyte in a preparation process due to local material exchange. Optical microscope images shows (2c) a dark blue diffusion region between a dark green PVA/PA/PANI/(PW-14%)-(PMO-10%) phase and a white PVA/SA/PA phase, which further supports the presence of seamless interfacial diffusion. The interpenetration or entanglement of polyvalent polymers at the interface is beneficial to strengthen the adhesion between electrodes and electrolytes. FIG. 2d shows the photos of interfacial changes of the PVA/PA/PANI/(PW-14%)-(PMO-10%)@PVA/SA/PA polyphase hydrogel under different stretching. It can be seen from FIG. 2d: 1) At a high stretching ratio (500%), the presence of an interfacial diffusion layer indicates that the initial stress is firstly applied to the PVA/SA/PA electrolyte, resulting in stress dispersion and protection of the interfacial layer and the PVA/PA/PANI/(PW-14%)-(PMO-10%) gel electrode. As the stretching ratio 800% is further increased, the stress gradually transfers to the interface, causing the diffusion layer to thin or even disappear. 2) No interfacial fracture is found during the whole stretching, which indicates that the wrapping structure of the polyphase hydrogel can effectively maintain the tight interfacial connection between the electrodes and the electrolytes. On the contrary, the sandwich hydrogel (FIG. 2e) shows cracks at the interface between PVA/PA/PANI/(PW-14%)-(PMO-10%) and PVA/SA/PA when the stretching ratio is 500%. As the stretching ratio is increased to 800%, the degree of interfacial cracks increases significantly, which eventually leads to interfacial delamination and displacement.

Test case 2 Mechanical properties of PVA/PA/PANI/(PW-14%)-(PMo-10%)@PVA/SA/PA integrated polyphase gel Both ends of the PVA/PA/PANI/(PW-14%)-(PMo-10%)@PVA/SA/PA integrated polyphase gel with a length of 30 mm, a width of 8 mm and a thickness of 3 mm were vertically fixed on an electronic universal material testing machine and longitudinally stretched at a speed of 20 mm/min and a temperature of 25° C. The applied force (the additional internal force borne per unit area) and the strain generated (when an object is forced to deform, the degree of deformation at various points in the body is generally not the same. A mechanical quantity used to describe the degree of deformation at a point) were recorded until fracture occurs. Then, the two parameters were plotted on an XY plot to obtain a familiar stress-strain curve. The stress-strain curve was data that showed the change of stress with the increase of strain. Young's modulus was obtained from the slope of the stress-strain curve to evaluate the strength. The toughness was calculated through the area under the stress-strain curve to evaluate the ductility.

Both ends of the integrated polyphase gel with a length of 30 mm, a width of 8 mm and a thickness of 3 mm were vertically fixed on the electronic universal material testing machine; and the loading (when the stress changes (0-200%), the sample has new plastic deformation, and this strain change is called loading) and unloading (when the stress changes, the sample returns to the initial state (200-0%), and no new plastic deformation occurs, and the stress change becomes unloading y) curves of the PVA/PA/PANI/(PW-14%)-(PMo-10%)@PVA/SA/PA integrated polyphase gel with increasing strain (0-200%) were recorded at a speed of 20 mm/min and a fixed maximum strain of 200%. The area of the loading and unloading curves is the area of a hysteresis loop, and the energy dissipation situation is evaluated by the size of the area of the hysteresis loop.

Figure 3:
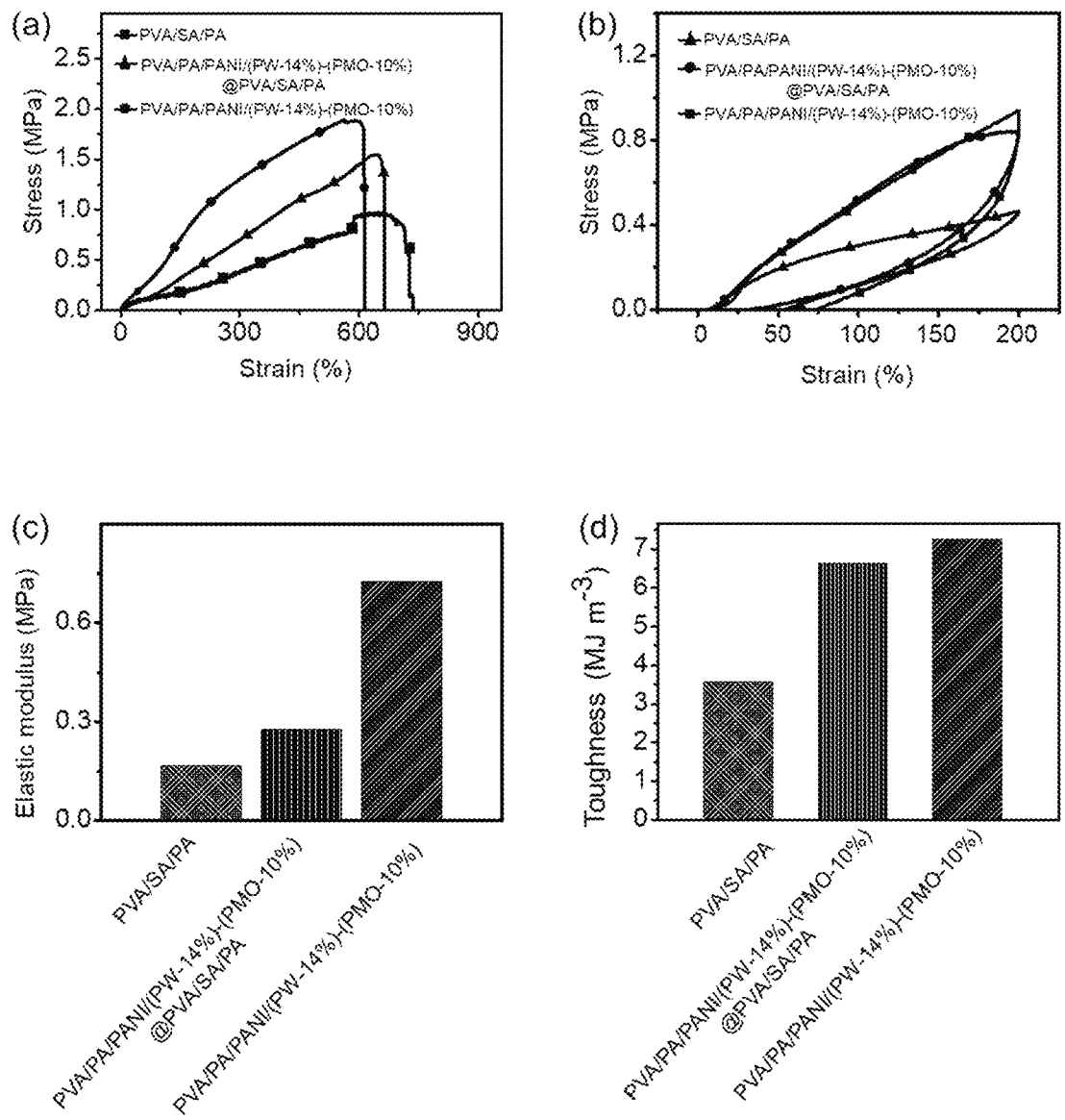
FIG. 3 shows the stress-strain curves (a) of PVA/SA/PA electrolyte, PVA/PA/PANI/(PW-14%)-(PMO-10%) electrode and PVA/PA/PANI/(PW-14%)-(PMO-10%)@PVA/SA/PA polyphase gel in embodiment 1 of the present invention; loading and unloading curves (b) of PVA/SA/PA electrolyte, PVA/PA/PANI/(PW-14%)-(PMO-10%) electrode and PVA/PA/PANI/(PW-14%)-(PMO-10%)@PVA/SA/PA polyphase gel at 200% fixed strain; and corresponding elastic modulus (c) and toughness (d) of PVA/SA/PA electrolyte, PVA/PA/PANI/(PW-14%)-(PMO-10%) electrode and PVA/PA/PANI/(PW-14%)-(PMO-10%) @PVA/SA/PA polyphase gel.

FIG. 3 shows the stress-strain curves of PVA/SA/PA hydrogel electrolyte, PVA/PA/PANI/(PW-14%)-(PMO-10%) and PVA/PA/PANI/(PW-14%)-(PMO-10%)@PVA/SA/PA polyphase hydrogel; the loading and unloading curves of PVA/SA/PA hydrogel, PVA/PA/PANI/(PW-14%)-(PMO-10%) hydrogel and PVA/PA/PANI/(PW-14%)-(PMO-10%)@PVA/SA/PA integrated polyphase gel samples at fixed strain of 200%; and corresponding elastic modulus and toughness.

The mechanical properties of the PVA/PA/PANI/(PW-14%)-(PMO-10%)@PVA/SA/PA polyphase hydrogel is tested by using typical stretching stress-strain curves. As shown in FIG. 3a, the stretching strain (614%) and tensile strength (1.83 MPa) of the PVA/PA/PANI/(PW-14%)-(PMO-10%)@PVA/SA/PA phase hydrogel are higher than those of the PVA/SA/PA hydrogel (737%, 0.90 MPa), but lower than those of the PVA/PA/PANI/(PW-14%)-(PMo-10%) hydrogel (660%, 1.49 MPa). The apparent hysteresis loops of the PVA/SA/PA hydrogel, PVA/PA/PANI/(PW-14%)-(PMO-10%) and PVA/PA/PANI/(PW-14%)-(PMO-10%)@PVA/SA/PA in FIG. 3b show that, the hydrogel crosslinking network brought about by dynamic reversible hydrogen bonds can dissipate the stretching energy effectively. The elastic modulus of the polyphase hydrogel is 0.282 MPa (FIG. 3c), and the toughness is 6.62 MJ m$^{-3}$ (FIG. 3d). Obviously, the polyphase hydrogel can integrate mismatched hydrogels into an integrated platform, thereby improving the tensile strength of the PVA/SA/PA hydrogels and improving the toughness of PVA/PA/PANI/(PW-14%)-(PMo-10%) hydrogels.

Test case 3 Comprehensive performance of flexible and stretchable supercapacitor of PVA/PA/PANI/(PW-14%)-(PMO-10%)@PVA/SA/PA integrated polyphase gel Two parallel wavy (as shown in FIG. 1, the thickness of the electrode is 3.0-3.5 mm, the length of the patterns is 3.9-4.2 cm, the width is 1.0-2.0 cm and the distance between two waves is 2.2-3.0 mm) PVA/PA/PANI/(PW-14%)-(PMO-10%) semigel electrodes were injected into the bulk phase of the PVA/SA/PA semigel electrolyte to form a polyphase hydrogel. The parallel wavy hydrogels can be directly used as the anode and the cathode of the flexible and stretchable supercapacitor electrode without any postprocessing. The PVA/SA/PA hydrogel can be used as both a stretchable electrolyte and an elastic substrate. The cyclic voltammetry (CV) curve of PVA/PA/PANI/(PW-14%)-(PMO-10%)@PVA/SA/PA integrated stretchable supercapacitor was tested with Chenhua Electrochemical workstation at 10-100 mV/s to evaluate the rate performance of PVA/PA/PANI/(PW-14%)-(PMO-10%)@PVA/SA/PA integrated stretchable supercapacitor. According to the galvanostatic charge-discharge (GCD) curve of the PVA/PA/PANI/(PW-14%)-(PMO-10%)@PVA/SA/PA integrated stretchable supercapacitor at current density of 0.2-1.0 mA cm$^{-2}$, the capacitance, energy density and power density were evaluated. According to the electrochemical impedance spectroscopy (EIS) curve of the PVA/PA/PANI/(PW-14%)-(PMO-10%)@PVA/SA/PA integrated stretchable supercapacitor, the electrode conductivity and diffusion behavior were evaluated. The CV and GCD curves of the PVA/PA/PANI/(PW-14%)-(PMO-10%)@PVA/SA/PA integrated stretchable supercapacitor under different stretching ratios (0%-250%) were tested. The capacitance retention situation was judged by analyzing the CV and GCD curves. The PVA/PA/PANI/(PW-14%)-(PMO-10%)@PVA/SA/PA integrated polyphase gel can well integrate bottom-up methods and top-down technologies, and conveniently construct processable, integratable, patternable and stretchable supercapacitor devices. This polyphase design has no external metal interconnection in series connection, which greatly simplifies the series integration process of the supercapacitor devices. CV and GCD tests were carried out for capacitors obtained by series connection at different stretching ratios to evaluate the performance of the flexible capacitors obtained by series connection.

Figure 4:
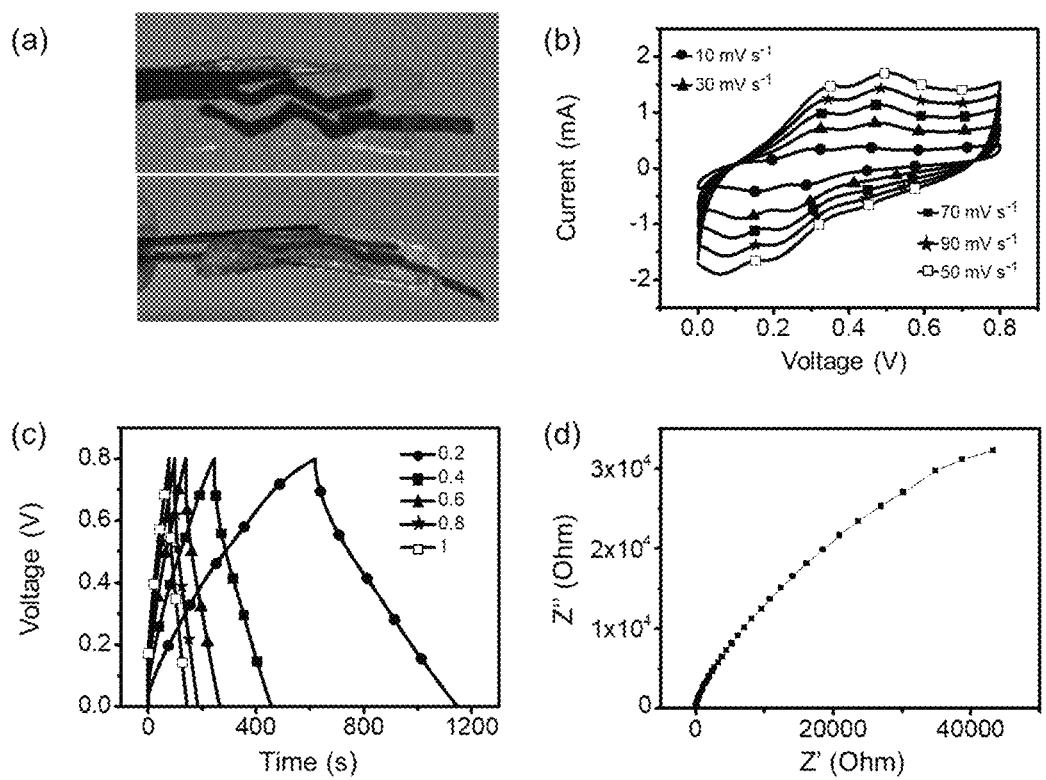
FIG. 4 shows a photo (a) of a polyphase gel flexible supercapacitor formed by injecting two parallel wavy semigels PVA/PA/PANI/(PW-14%)-(PMo-10%) as electrodes into PVA/SA/PA semigels as stretchable electrolytes in embodiment 1 of the present invention; cyclic voltammetry curve (b) of PVA/PA/PANI/(PW-14%)-(PMO-10%)@PVA/SA/PA polyphase hydrogel stretchable supercapacitor measured in a range of 10-100 mV S$^{-1}$; GCD curve (c) of a stretchable supercapacitor measured in a range of 0.2-1.0 mA cm$^{-2}$; and SC electrochemical impedance spectroscopy (EIS) (d) of PVA/PA/PANI/(PW-14%)-(PMO-10%) @PVA/SA/PA polyphase hydrogel.

FIG. 4 shows that the PVA/PA/PANI/(PW-14%)-(PMO-10%) semigel electrode is injected into the PVA/SA/PA semigel electrolyte to form a flexible and stretchable supercapacitor of a polyphase gel (FIG. 4a). It can be seen from FIG. 4b that with the increase of scanning speed, the shape of the cyclic voltammetry curve remains unchanged, but the current intensity increases significantly, which indicates that the PVA/PA/PANI/(PW-14%)-(PMO-10%)@PVA/SA/PA polyphase hydrogel has high rate capability. The GCD test (FIG. 4c) shows a nonlinear but symmetrical curve, which indicates that the Faraday properties of the polyphase hydrogel are consistent with the cyclic voltammetry curve. At current densities of 0.2, 0.4, 0.6, 0.8 and 1.0 mA cm$^{-2}$, the specific capacitance (Cs) of the PVA/PA/PANI/(PW-14%)-(PMO-10%)@PVA/SA/PA polyphase gel is 258.5, 209.4, 181.5, 178.0 and 167.5 F cm$^{-2}$ respectively. At power density of 576.0 μW cm$^{-2}$, the maximum energy density of PVA/PA/PANI/(PW-14%)-(PMO-10%)@PVA/SA/PA polyphase hydrogel based on a single electrode can reach 82.7 µWh cm$^{-2}$. Even at the maximum power density of 2880.0 µW cm$^{-2}$, the energy density can be maintained at 53.6 µW h cm$^{-2}$. Electrochemical impedance spectroscopy (EIS) shows no semicircle in a high frequency range (FIG. 4d), which indicates that the PVA/PA/PANI/(PW-14%)-(PMO-10%) hydrogel electrode has high conductivity and low charge transfer resistance during charge and discharge. A straight line in a low frequency range corresponds to the diffusion process that ions enter the electrodes, which indicates good capacitive behaviors. Low impedance values at 1 Hz (1152) indicate that the ions are easily inserted into the PVA/PA/PANI/(PW-14%)-(PMO-10%) hydrogel electrode.

Figure 5:
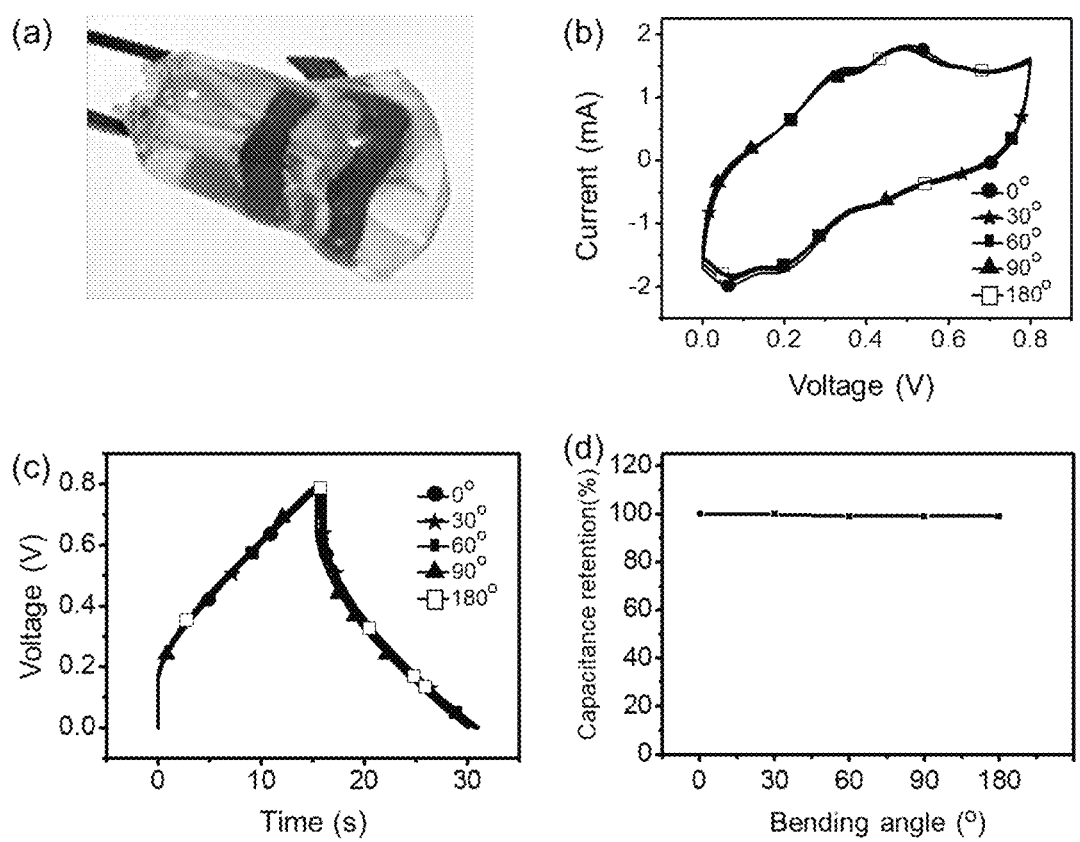
FIG. 5 shows a photo (a) of a flexible and stretchable supercapacitor of a polyphase gel formed by injecting two parallel wavy semigels PVA/PA/PANI/(PW-14%)-(PMo-10%) as electrodes into PVA/SA/PA semigels as stretchable electrolytes in embodiment 1 of the present invention; cyclic voltammetry curve (b) under different bending angles; galvanostatic charge-discharge (c); and capacitance retention diagram (d) under different bending.

FIG. 5 shows the cyclic voltammetry curves, GCD and capacitance retention rate of a flexible and stretchable supercapacitor of PVA/PA/PANI/(PW-14%)-(PMO-10%)@PVA/SA/PA integrated polyphase gel (FIG. 5a) at different bending angles. It can be seen from the figure that the CV (FIG. 5b) and GCD curves (FIG. 5c) of the flexible and stretchable supercapacitor prepared by the PVA/PA/PANI/(PW-14%)-(PMO-10%)@PVA/SA/PA polyphase hydrogel almost remain unchanged at different bending angles. The PVA/PA/PANI/(PW-14%)-(PMO-10%)@PVA/SA/PA stretchable supercapacitor has a capacitance retention rate of more than 99% during bending deformation (FIG. 5d), which indicates that the polyphase hydrogel structure has a reliable adaptability to mechanical deformation.

Figure 6:
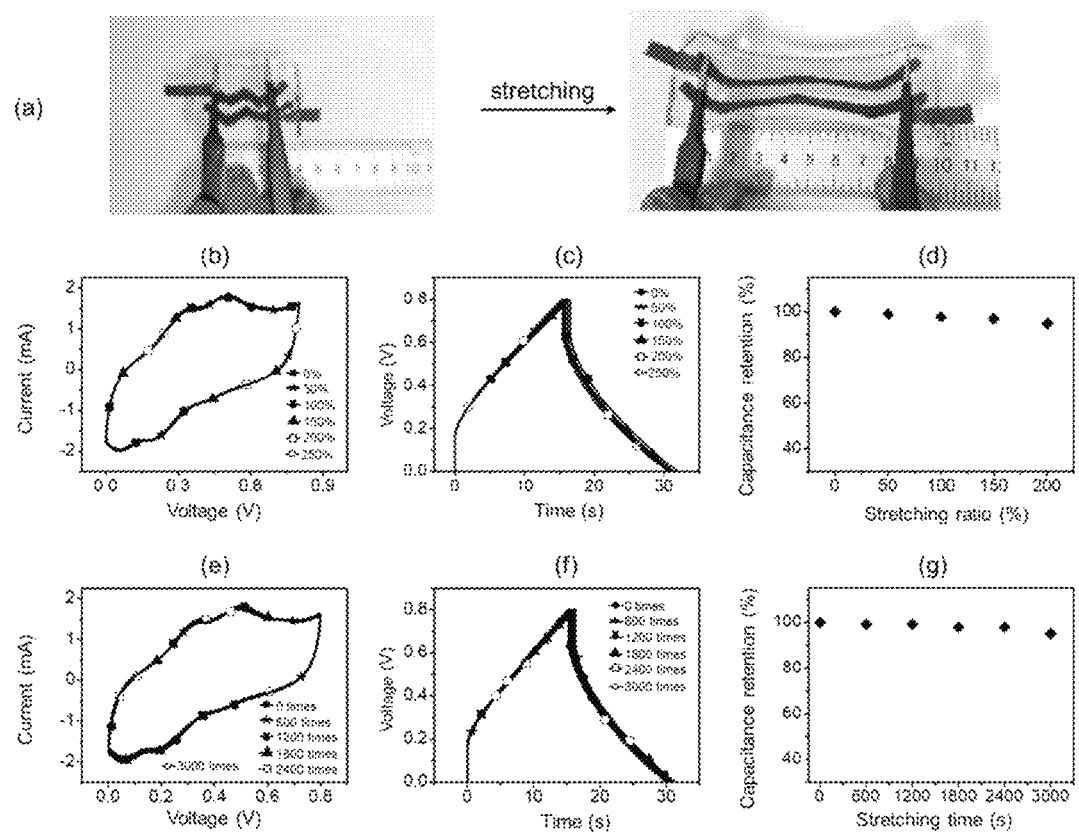
FIG. 6 shows a stretching photo (a) of a flexible and stretchable supercapacitor of a polyphase gel formed by injecting two parallel wavy semigels PVA/PA/PANI/(PW-14%)-(PMO-10%)@PVA/SA/PA as electrodes into PVA/SA/PA semigels as stretchable electrolytes in embodiment 1 of the present invention; cyclic voltammetry curve (b) under different stretching ratios, galvanostatic charge-discharge curve (c), capacitance retention rate (d), cyclic voltammetry curve (e) under different stretching times; GCD curve (f) under different stretching times; and capacitance retention rate (g) under different stretching times.

FIG. 6 shows the cyclic voltammetry curve and capacitance retention rate of a flexible and stretchable supercapacitor of a polyphase gel formed by injecting PVA/PA/PANI/(PW-14%)-(PMO-10%) semigel electrode into PVA/SA/PA semigel (FIG. 6a) under different stretching. It can be seen from the figure that the CV and GCD curves of the PVA/PA/PANI/(PW-14%)-(PMO-10%)@PVA/SA/PA stretchable supercapacitor under stretching are shown in FIGS. 6b and 6c respectively. The capacitance calculated from the GCD curve reaches 93.0% at 250% strain (FIG. 6d). In order to further analyze the mechanical stability and the durability of polyphase supercapacitors, 3000 continuous 300% stretching cycles of long-term deformation tests are carried out. After repeated stretching for 3000 times, the cyclic voltammetry curve (FIG. 6e) and GCD curve (FIG. 6f) of the stretchable supercapacitor do not change significantly, and the initial capacity remains at 95.0% (FIG. 6g), which indicates that the polyphase hydrogel SC has good deformation resistance.

Figure 7:
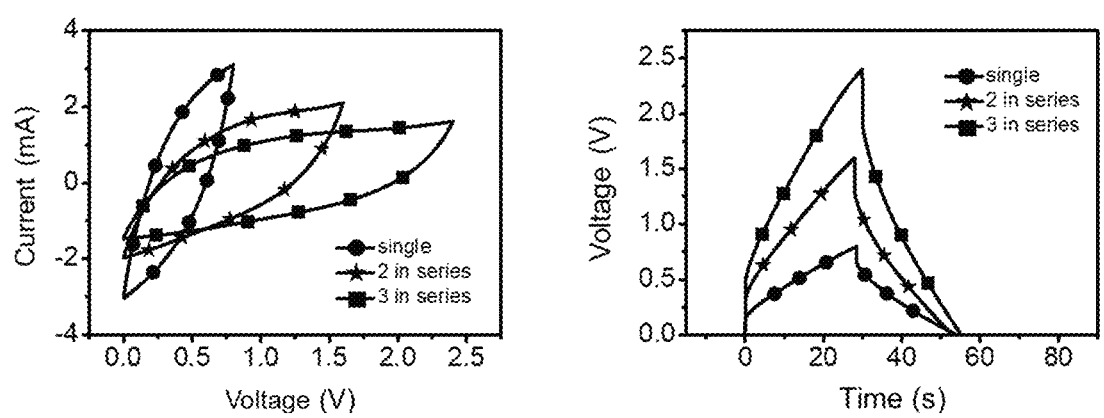
FIG. 7 shows CV and GCD when four groups of identical polyphase gel supercapacitors are assembled in series in embodiment 1 of the present invention.

FIG. 7 shows four groups of flexible and stretchable supercapacitors assembled by PVA/PA/PANI/(PW-14%)-(PMO-10%)@PVA/SA/PA in series with wires. It can be seen from CV curve and GCD curve that the PVA/PA/PANI/(PW-14%)-(PMO-10%)@PVA/SA/PA flexible and stretchable supercapacitors in series can output higher current or voltage, which reveals the application prospect of the flexible integrated PVA/PA/PANI/(PW-14%)-(PMO-10%) @PVA/SA/PA polyphase gel.

Embodiment 2

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 1 g of PW and 5 g of PMO ($H_3PW_{12}O_{40}$, with molecular weight of 2880.05 g/mol, and $H_3PMo_{12}O_{40}$, with molecular weight of 1825.25 g/mol), and then the PVA/PA/PANI/(PW-4%)-(PMo-20%)@PVA/SA/PA polyphase hydrogel was prepared. According to the operation steps of embodiment 1, the PVA/PA/PANI/(PW-4%)-(PMo-20%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 92% whether under bending or stretching (stretch ratios of 0-250%), which indicates that the prepared flexible and stretchable supercapacitor has good stretching resistance.

Embodiment 3

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 2 g of PW and 4 g of PMO ($H_3PW_{12}O_{40}$, with molecular weight of 2880.05 g/mol, and $H_3PMo_{12}O_{40}$, with molecular weight of 1825.25 g/mol), and then the PVA/PA/PANI/(PW-8%)-(PMo-16%)@PVA/SA/PA polyphase hydrogel was prepared. According to the operation steps of embodiment 1, the PVA/PA/PANI/(PW-8%)-(PMo-16%) semigel was injected into the PVA/SA/PA semigel stretchable electrolyte to form an integrated polyphase gel which was then assembled into a flexible supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 91% whether under bending or stretching (stretch ratios of 0-250%), which indicates that the prepared flexible and stretchable supercapacitor has good stretching resistance.

Embodiment 4

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 3 g of PW and 3 g of PMO ($H_3PW_{12}O_{40}$, with molecular weight of 2880.05 g/mol, and $H_3PMo_{12}O_{40}$, with molecular weight of 1825.25 g/mol), and then the PVA/PA/PANI/(PW-12%)-(PMo-12%)@PVA/SA/PA polyphase hydrogel was prepared. According to the operation steps of embodiment 1, the PVA/PA/PANI/(PW-12%)-(PMo-12%) semigel was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible supercapacitor were measured at different bending angles and different stretching ratios (stretching ratios of 0-250%). The results show that the capacitance retention rate of the flexible and stretchable supercapacitor is more than 91% whether under bending or stretching (stretch ratios of 0-250%), which indicates that the prepared flexible and stretchable supercapacitor has good stretching resistance.

Embodiment 5

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 5 g of PW and 1 g of PMO ($H_3PW_{12}O_{40}$, with molecular weight of 2880.05 g/mol, and $H_3PMo_{12}O_{40}$, with molecular weight of 1825.25 g/mol), and then the PVA/PA/PANI/(PW-20%)-(PMo-4%)@PVA/SA/PA polyphase hydrogel was prepared. According to the operation steps of embodiment 1, the PVA/PA/PANI/(PW-20%)-(PMo-4%) semigel was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 87% whether under bending or stretching (stretch ratios of 0-250%), which indicates that the prepared flexible and stretchable supercapacitor has good stretching resistance.

Embodiment 6

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 4 g of PW and 2 g of $H_6P_2W_{18}O_{62}$ ($H_3PW_{12}O_{40}$, with molecular weight of 2880.05 g/mol, and $H_6P_2W_{18}O_{62}$, with molecular weight of 4369.62 g/mol), and then the PVA/PA/PANI/(PW-16%)-($P_2W_{18}$-8%)@PVA/SA/PA polyphase hydrogel was prepared. According to the operation steps of embodiment 1, the PVA/PA/PANI/(PW-16%)-($P_2W_{18}$-8%) semigel was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 86% whether under bending or stretching (stretch ratios of 0-250%), which indicates that the prepared flexible and stretchable supercapacitor has good stretching resistance.

Embodiment 7

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 2 g of PW and 4 g of $H_6P_2W_{18}O_{62}$ ($H_3PW_{12}O_{40}$, with molecular weight of 2880.05 g/mol, and $H_6P_2W_{18}O_{62}$, with molecular weight of 4369.62 g/mol), and then the PVA/PA/PANI/(PW-8%)-($P_2W_{18}$-16%)@PVA/SA/PA polyphase hydrogel was prepared. According to the operation steps of embodiment 1, the PVA/PA/PANI/(PW-8%)-($P_2W_{18}$-16%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 88% whether under bending or stretching (stretch ratios of 0-250%), which indicates that the prepared flexible and stretchable supercapacitor has good stretching resistance.

Embodiment 8

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 4 g of PMO and 2 g of $H_6P_2W_{18}O_{62}$ ($H_3PMo_{12}O_{40}$, with molecular weight of 1825.25 g/mol, and $H_6P_2W_{18}O_{62}$, with molecular weight of 4369.62 g/mol), and then the PVA/PA/PANI/(PMO-16%)-($P_2W_{18}$-8%)@PVA/SA/PA polyphase hydrogel was prepared. According to the operation steps of embodiment 1, the PVA/PA/PANI/(PMO-16%)-($P_2W_{18}$-8%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 87% whether under bending or stretching (stretch ratios of 0-250%), which indicates that the prepared flexible and stretchable supercapacitor has good stretching resistance.

Embodiment 9

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 2 g of PMO and 4 g of $H_6P_2W_{18}O_{62}$ ($H_3PMo_{12}O_{40}$, with molecular weight of 1825.25 g/mol, and $H_6P_2W_{18}O_{62}$, with molecular weight of 4369.62 g/mol), and then the PVA/PA/PANI/(PMO-8%)-($P_2W_{18}$-16%) @PVA/SA/PA polyphase hydrogel was prepared. According to the operation steps of embodiment 1, the PVA/PA/PANI/(PMO-8%)-($P_2W_{18}$-16%) semigel was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 85% whether under bending or stretching (stretch ratios of 0-250%), which indicates that the prepared flexible and stretchable supercapacitor has good stretching resistance.

Embodiment 10

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 2 g of PMO and 4 g of $H_4SiW_{12}O_{40}$ ($H_3PW_{12}O_{40}$, with molecular weight of 2880.05 g/mol, and $H_4SiW_{12}O_{40}$, with molecular weight of 2878.17 g/mol), and then the PVA/PA/PANI/(PMO-8%)-(SiW-16%)@PVA/SA/PA polyphase hydrogel was prepared. According to the operation steps of embodiment 1, the PVA/PA/PANI/(PMO-8%)-(SiW-16%)

semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 86% whether under bending or stretching (stretch ratios of 0-250%), which indicates that the prepared flexible and stretchable supercapacitor has good stretching resistance.

Embodiment 11

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 4 g of PMO and 2 g of $H_4SiW_{12}O_{40}$ ($H_3PMo_{12}O_{40}$, with molecular weight of 1825.25 g/mol, and $H_4SiW_{12}O_{40}$, with molecular weight of 2878.17 g/mol), and then the PVA/PA/PANI/(PMO-16%)-(SiW-8%)@PVA/SA/PA polyphase hydrogel was prepared. According to the operation steps of embodiment 1, the PVA/PA/PANI/(PMO-16%)-(SiW-8%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 88% whether under bending or stretching (stretch ratios of 0-250%), which indicates that the prepared flexible and stretchable supercapacitor has good stretching resistance.

Embodiment 12

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 2 g of PW and 4 g of $H_4SiW_{12}O_{40}$ ($H_3PW_{12}O_{40}$, with molecular weight of 2880.05 g/mol, and $H_4SiW_{12}O_{40}$, with molecular weight of 2878.17 g/mol), and then the PVA/PA/PANI/(PW-8%)-(SiW-16%)@PVA/SA/PA polyphase hydrogel was prepared. According to the operation steps of embodiment 1, the PVA/PA/PANI/(PW-8%)-(SiW-16%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 83% whether under bending or stretching (stretch ratios of 0-250%), which indicates that the prepared flexible and stretchable supercapacitor has good stretching resistance.

Embodiment 13

Basically the same as embodiment 1, other conditions remain unchanged. 4 g of PW and 2 g of PMO ($H_3PW_{12}O_{40}$, with molecular weight of 2880.05 g/mol, and $H_3PMo_{12}O_{40}$, with molecular weight of 1825.25 g/mol) were changed to 4 g of PW and 2 g of $H_4SiW_{12}O_{40}$ ($H_3PW_{12}O_{40}$, with molecular weight of 2880.05 g/mol, and $H_4SiW_{12}O_{40}$, with molecular weight of 2878.17 g/mol), and then the PVA/PA/PANI/(PW-16%)-(SiW-8%)@PVA/SA/PA polyphase hydrogel was prepared. According to the operation steps of embodiment 1, the PVA/PA/PANI/(PW-16%)-(SiW-8%) semigel electrode was injected into the PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-250%). The results show that the capacitance retention rate of the flexible and stretchable supercapacitor is more than 85% whether under bending or stretching (stretch ratios of 0-250%), which indicates that the prepared flexible and stretchable supercapacitor has good stretching resistance.

Embodiment 14

Basically the same as embodiment 1, other conditions remain unchanged. The wavy PVA/PA/PANI/(PW-14%)-(PMO-10%) electrode was changed to a rectangular PVA/PA/PANI/(PW-14%)-(PMO-10%) electrode. Then PVA/PA/PANI/(PW-14%)-(PW-10%)@PVA/SA/PA polyphase hydrogel with rectangular electrode shape was prepared. According to the operation steps of embodiment 1, a rectangular PVA/PA/PANI/(PW-14%)-(PMO-10%) semigel electrode was injected into a PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-140%). The results show that the capacitance retention rate of the flexible and stretchable supercapacitor is more than 77% whether under bending or stretching (stretch ratios of 0-140%), which indicates that the prepared flexible and stretchable supercapacitor has good stretching resistance.

Embodiment 15

Basically the same as embodiment 1, other conditions remain unchanged. The wavy PVA/PA/PANI/(PW-14%)-(PMO-10%) electrode was changed to a V-shaped PVA/PA/PANI/(PW-14%)-(PMO-10%) electrode. Then PVA/PA/PANI/(PW-14%)-(PW-10%)@PVA/SA/PA polyphase hydrogel with V-shaped electrode shape was prepared. According to the operation steps of embodiment 1, a rectangular PVA/PA/PANI/(PW-14%)-(PMO-10%) semigel electrode was injected into a PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-200%). The results show that the capacitance retention rate of the flexible and stretchable supercapacitor is more than 89% whether under bending or stretching (stretch ratios of 0-200%), which indicates that the prepared flexible and stretchable supercapacitor has good stretching resistance.

Embodiment 16

Basically the same as embodiment 1, other conditions remain unchanged. The wavy PVA/PA/PANI/(PW-14%)-(PMO-10%) electrode was changed to a linear PVA/PA/PANI/(PW-14%)-(PMO-10%) electrode. Then PVA/PA/PANI/(PW-14%)-(PW-10%)@PVA/SA/PA polyphase hydrogel with linear electrode shape was prepared. According to the operation steps of embodiment 1, a rectangular PVA/PA/PANI/(PW-14%)-(PMO-10%) semigel electrode was injected into a PVA/SA/PA semigel stretchable electrolyte to form an integrated polyphase gel which was then assembled into a flexible and stretchable supercapacitor. Then, the cyclic voltammetry curve and the charge-discharge curve of the prepared flexible and stretchable supercapacitor were measured at different bending angles and different stretching ratios (stretching ratios of 0-150%). The results show that the capacitance retention rate of the flexible and stretchable supercapacitor is more than 78% whether under bending or stretching (stretch ratios of 0-150%), which indicates that the prepared flexible and stretchable supercapacitor has good stretching resistance.

Although the embodiments of the present invention have been shown and described above, it will be appreciated that the above embodiments are exemplary and shall not be understood as limitations to the present invention. Those ordinary skilled in the art can make changes, amendments, replacements and variations to the above embodiments within the scope of the present invention.

What is claimed is:

1. A method for preparing a flexible and stretchable supercapacitor by using an integrated polyphase hydrogel, comprising:
    preparing the integrated polyphase hydrogel through steps of:
    (1) dissolving polyvinyl alcohol and phytic acid in water, then adding sulfuric acid, stirring at 75-95° C. for 2-3 h to obtain a homogeneous solution, and then cooling to room temperature to form PVA/SA/PA semigel electrolyte, wherein the PVA/SA/PA semigel electrolyte is composed of the following mass fractions of raw materials: 13.76-26.20% of polyvinyl alcohol, 58.07-80.64% of phytic acid, and the balance of sulfuric acid,
    (2) dissolving the polyvinyl alcohol in the phytic acid, stirring at 75-95° C. for 2-3 h, then adding ammonium persulfate and heteropoly acid to obtain a homogeneous solution, adding phytic acid and aniline to the solution, stirring continuously at 75-95° C. for 3-4 h, and freezing at −30 to −20° C. for 4-6 h to obtain a PVA/PA/PANI/HPA semigel electrode, wherein the heteropoly acid is $H_3PW_{12}O_{40}$ and $H_3PMo_{12}O_{40}$; and the PVA/PA/PANI/HPA semigel electrode is composed of the following mass fractions of raw materials: 7.97-10.4% of polyvinyl alcohol, 53.14-69.84% of phytic acid, 9.52-29.63% of heteropoly acid, 1.72%-2.44% of aniline and the rest of ammonium persulfate,
    (3) injecting the PVA/SA/PA semigel electrolyte into a mold, and then injecting the PVA/PA/PANI/HPA semigel electrode into the PVA/SA/PA semigel electrolyte to form parallel electrodes with controllable spacing; covering the mold with the PVA/SA/PA semigel electrolyte to ensure that the PVA/PA/PANI/HPA is fully embedded into the bulk phase of the PVA/SA/PA semigel electrolyte, finally freezing the mold and then thawing at room temperature to obtain an integrated polyphase hydrogel; and
    using the integrated polyphase hydrogel to ensure that two parallel gel electrodes are completely placed in a gel electrolyte in a preparation process of the flexible and stretchable supercapacitor to form an integrated polyphase gel comprising both the electrodes and the electrolyte; and
    then connecting a carbon cloth at one end of each electrode respectively to obtain the flexible and stretchable supercapacitor.

2. The method for preparing a flexible and stretchable supercapacitor by using an integrated polyphase hydrogel according to claim 1, wherein the thickness of the gel electrodes is 3.0-3.5 mm, the length is 3.9-4.2 cm, the width is 1.0-2.0 cm, and a distance between the gel electrodes is 2.2-3.0 mm.

3. The method for preparing a flexible and stretchable supercapacitor by using an integrated polyphase hydrogel according to claim 1, wherein the two parallel gel electrodes are formed by connecting a pair of parallel electrodes or multiple pairs of parallel electrodes in series.

4. The method for preparing a flexible and stretchable supercapacitor by using an integrated polyphase hydrogel according to claim 1, wherein the freezing temperature in step (3) is −30 to −20° C., freezing time is 22-24 h and thawing time is 2-3 h.

* * * * *